Dec. 8, 1942.   F. A. BICKFORD   2,304,142
GLASS FILTER
Filed Jan. 2, 1940
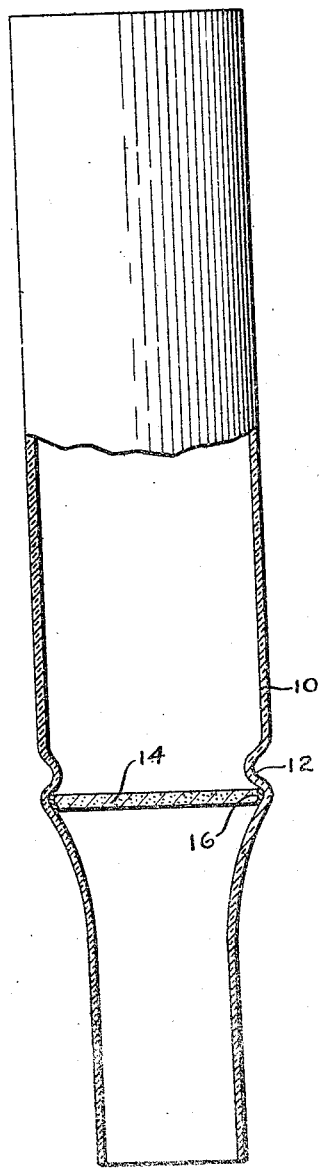
INVENTOR.
FRED A. BICKFORD
BY Patented Dec. 8, 1942

2,304,142

UNITED STATES PATENT OFFICE 2,304,142

GLASS FILTER

Fred A. Bickford, Corning, N. Y., assignor to Corning Glass Works, Corning, N. Y., a corporation of New York Application January 2, 1940, Serial No. 312,110

4 Claims. (Cl. 210—112)

This application relates to glass filters and more particularly to filters formed from powdered glass for use in chemical laboratories.

Heretofore filters have been manufactured by grinding glass to a powder, screening the powder to separate particles of the desired degree of fineness and sintering the particles to form a porous coherent mass. For certain purposes it has been found desirable to fuse such a filter into a solid glass vessel in the manner shown in United States Patent No. 1,620,815. While such filters have met with wide acceptance and use in chemical laboratories, it has been found that they possess certain inherent weaknesses of strength and difficulties of use which are both annoying and constitute a considerable item of laboratory expense.

The object of the present invention is an improved form of filter structure which is strong and durable, easily manufactured, and of uniform reproduceable characteristics.

The above and other objects are attained in my improved filter which includes among its features a disc of sintered glass powder whose edges have been coated with a finely divided adherent refractory powder and which is maintained in position across a passage in a glass vessel by the contraction of the walls of the vessel above and below the plane of the disc and into contact with its edge. These and other features will be more readily apparent upon study of the drawing forming part of this specification in which:

The single figure is a vertical cross-section of a filter structure embodying my invention.

According to my invention, glass of the desired chemical composition is first crushed and subsequently ground for a period sufficient to give the desired degree of porosity in the final filter plate. The powdered glass may then be molded or otherwise shaped into the desired form after which it is sintered into a coherent body. For purposes of discussion, a disc-shaped filter will be referred to. I have found that the degree of porosity obtained in a given filter depends upon three things: the initial grain size of the material, the time during which it is heated to sintering temperatures, and the sintering temperature itself. Temperatures will vary with the particular glass composition employed, but will in general be longer and higher for the coarser filters made from coarser grain size material.

After the filter plates have been sintered into a porous coherent body, the edges may be slightly rounded and trued-up by grinding, scraping, or similar processes. I have found it desirable to coat these edges of my filter plates with a thin layer of finely powdered, highly refractory material such as aluminum oxide, ground sand, cordierite, silicon carbide, or magnesium oxide to prevent sealing of the disc to the glass body in subsequent assembly of the filter. This material may best be applied by spraying it on as a very thin slip which, upon drying, will leave a powdery layer about the circumference of the disc which is in the neighborhood of .001 of an inch in thickness. When so treated, I introduce my filter discs into a glass body such as the illustrated tube 10 which is of approximately the same diameter as the disc and which has a slight contraction formed in its walls, as shown at 12 in the accompanying figure, thereby producing a slight shoulder against which the disc 14 may bear. When so positioned, I heat the glass body in the vicinity of the disc just to the point where it can be worked, and by means of suitable tools swage down the walls of the tube into contact with the periphery of the disc and on either side thereof sufficiently to form a tight mechanical seal between the wall and the disc and retain the disc against longitudinal displacement with the tube. It has been found that the presence of the layer of finely powdered material 16 prevents fusion between the glass of the disc 14 and the wall of the vessel while at the same time forming a tight joint which prevents leakage of the precipitate around the edges of the disc and between them and the vessel wall.

While most of the glasses normally used in laboratory apparatus have a satisfactory resistance to chemical attack in solid form where little area is exposed to attack, these same glasses may have insufficient resistance when finely divided with enormously increased surface area. Thus it may become desirable to make the filter plate of one composition while making the surrounding walls of a different composition. Such differences in composition usually carry with them differences in coefficient of thermal expansion, and if the parts were fused into an integral body fracture would be almost certain to occur upon changes in temperature. With my construction I have found it possible to form the plate 14 and tube 10 of different glasses, the layer of powdered material 16 acting as a cushion to absorb the differential expansion of the parts while at the same time maintaining a tight seal between the parts.

Still further advantages are attributable to the construction herein disclosed. Inasmuch as there is no fusion of the parts one with another, the temperatures employed in forming the article need not exceed the melting point of the filter disc and, accordingly, the entire area of the disc as originally formed remains available for the passage of filtrate. For this reason the capacity of a filter may be accurately predetermined and reproduced without substantial variation and a greater filtering capacity obtained for a given sized unit than in prior art structures. Similarly, since relatively low temperatures are employed and there are no differential strains set up in the ware by contraction of the parts on cooling, prolonged annealing of the usual type may be eliminated without detriment to the completed filter.

What is claimed is:

1. A filter comprising a tubular glass body, a filter plate formed of sintered particles of glass positioned within said glass body and extending thereacross, said body having areas of reduced diameter on either side of said plate mechanically locking said plate in position within said body, and a thin layer of powdered material of higher melting point than said body and plate interposed between the edge of said plate and said body and preventing leakage therebetween or fusion thereof.

2. A filter comprising a hollow glass body, a porous sintered glass filter positioned within said body and extending thereacross, identations in the wall of said body maintaining said filter in position in said body and a thin layer of powdered material of higher melting point than said body and filter retained in the space between said body and said filter and preventing leakage therebetween.

3. A filter comprising a hollow glass body, a porous sintered glass filter plate positioned transversely within said body, sections of said body being displaced on both sides of said plate to mechanically lock it in position within said body and a thin layer of powdered material having a higher melting point than the materials of said body and plate completely filling the space between the edge of said plate and the adjacent wall of said body.

4. A filter comprising a hollow glass body, a glass filter plate positioned transversely within said body and formed of a glass of different chemical composition from that of said body, said plate being retained in position by the displacement of selected areas of the wall of said body adjacent said plate, and a layer of powdered material of higher melting point than said body and plate coating the edge of said plate adjacent said body and completely filling the space therebetween.

FRED A. BICKFORD.